United States Patent [19] [11] 3,875,017
Saari et al. [45] Apr. 1, 1975

[54] MULTI-STAGE THIN FILM EVAPORATOR HAVING A HELICAL VAPOR FLOW PATH

[76] Inventors: Risto Väinö Juhani Saari, 02440 Luoma, Harjula; Esko Ensio Huhta-Koivisto, Lumikintie 6 A 77, 00820 Helsinki 82, both of Finland

[22] Filed: Apr. 24, 1972

[21] Appl. No.: 246,670

[52] U.S. Cl............. 202/174, 203/DIG. 17, 203/11, 159/2 MS, 159/17, 159/13 B, 159/31, 159/24 R
[51] Int. Cl............................................... B01d 3/02
[58] Field of Search.. 203/11; 159/31, 13 B, DIG. 8, 159/24 R, 17, 2 MS; 202/174, 197, 198; 55/452

[56] References Cited
UNITED STATES PATENTS

| 764,419 | 7/1904 | Bruun | 159/31 |
| 1,138,460 | 5/1915 | Derby | 55/452 |
| 2,333,712 | 11/1943 | Eckey | 202/198 |
| 2,636,846 | 4/1953 | Lavigne | 159/28 C |
| 3,060,106 | 10/1962 | Keunecke et al. | 202/197 |
| 3,219,554 | 11/1965 | Woodward | 203/11 |
| 3,476,654 | 11/1969 | Sieder | 203/11 |
| 3,607,668 | 9/1971 | Williamson | 203/11 |

Primary Examiner—A. Louis Monacell
Assistant Examiner—Frank Sever
Attorney, Agent, or Firm—Richards & Geier

[57] ABSTRACT

A multi-stage distillation method and device use several distillation stages. A part of the vapor liberated in each distillation stage is condensed in heat exchange with the liquid being distilled. A part of this liquid is later on evaporated in the same distillation stage. A part of the vapor is condensed in heat exchange with the liquid to be distilled. This condensate is cooled in heat exchange with the liquid in subsequent distillation stages operating at lower temperatures.

7 Claims, 5 Drawing Figures

3,875,017 ns pour quantity has to be pumped by compressor, while correspondingly in the single-stage vapor compression all of the vapour is pumped up to higher temperature.

The method has been described in greater detail in the attached drawings, which present schematically some of its embodiments. In the figures, for the sake of clarity, the presentation concerns only a few distillation stages, while in actual practice their number may be greater.

Figure 1:
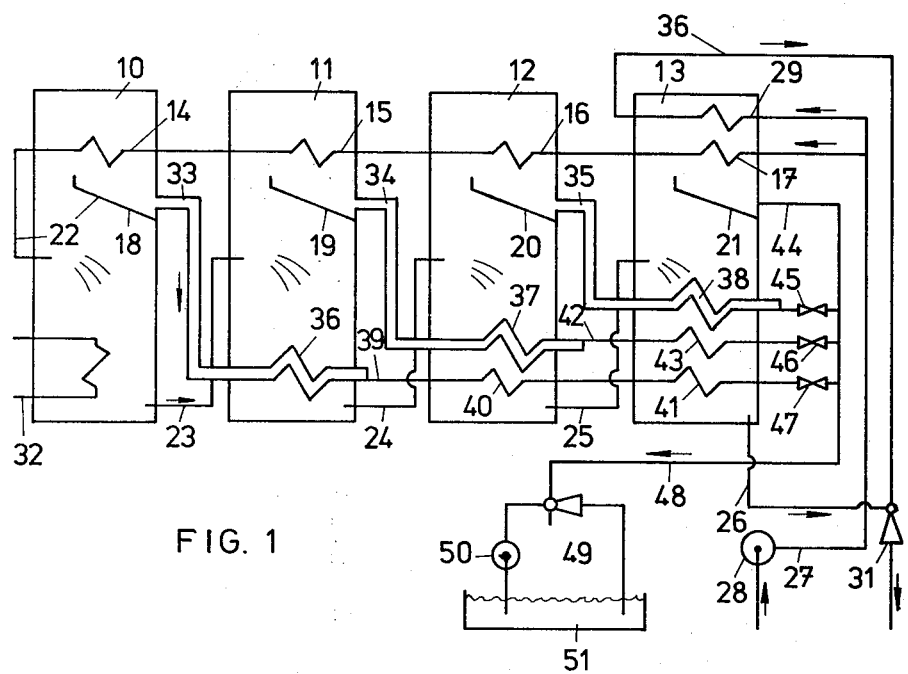

FIG. 1 shows an embodiment wherein the energy is supplied in the form of heat by introducing steam or electricity.

Figure 2:
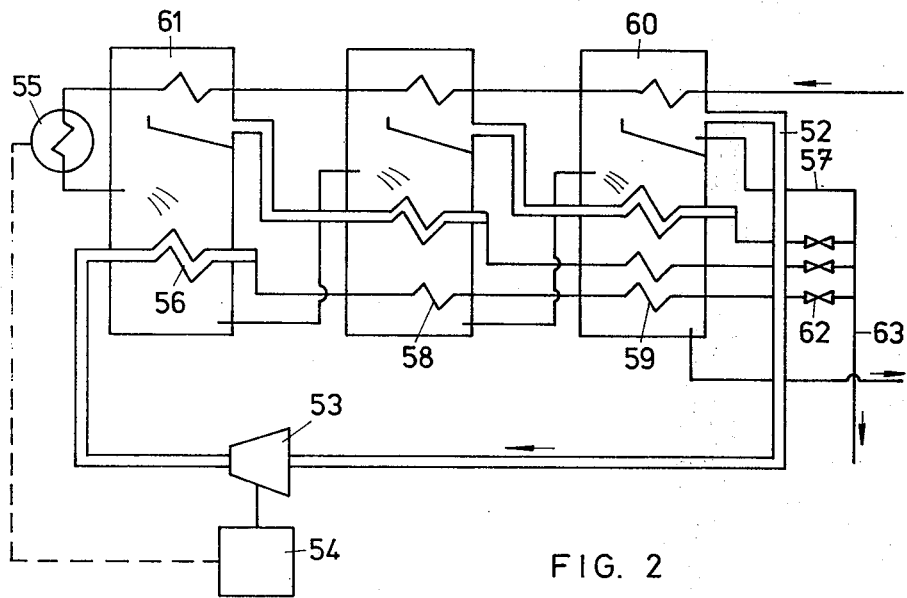

In the embodiment of FIG. 2 the energy is supplied by means of a compressor.

Figure 3:
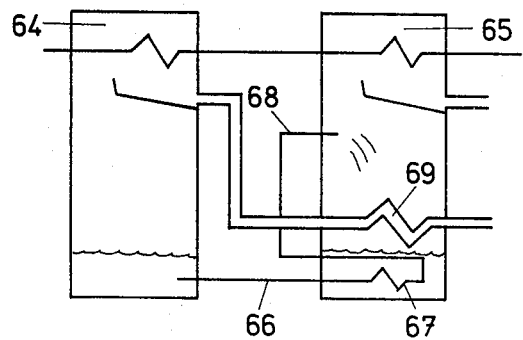
Figure 4:
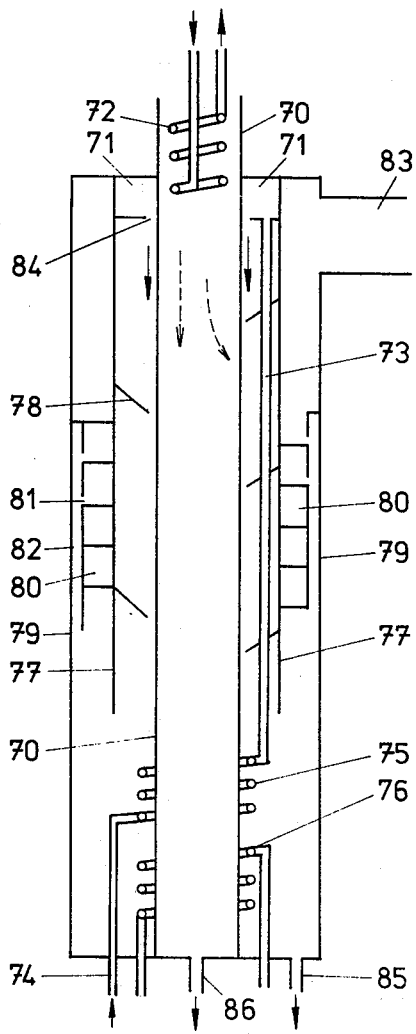

FIG. 3 displays a detail in the transfer of the liquid to be distilled from one distillation stage to the next, and FIG. 4 shows a design solution for one distillation stage in a device carrying out the method.

In the embodiment of FIG. 1 four distillation stages, 10, 11, 12 and 13, have been shown. The pump 28 delivers the water to be distilled by the pipe 27 to the condensers 17, 16, 15 and 14, where it is warmed up, while the vapour is condensed, and flows through the pipe 22 into the evaporator of the distillation stage 10. The heat exchanger 32, which may operate by electricity or steam, further heats the water, whereby part of it evaporates. Part of the vapour condenses in the condenser 14, and another part flows through the pipe 33 to the heat exchanger 36 in the distillation stage 11, together with the condensate that has accumulated on the bottom 18 of distillation stage 10. The water which was not evaporated in distillation stage 10 continues by the pipe 23 to the evaporator of distillation stage 11, where part of it evaporates, as a result of the lower pressure prevailing there, and the remainder of the water is correspondingly cooled when it imparts to the vapour its heat of vaporization. The cooled water is placed, by means of the heat exchanger 36, in heat exchange with the vapour coming from the distillation stage 10, which vapour condenses and delivers its latent heat to an equivalent amount of water, which in its turn evaporates.

The vapour condenses in the condensers 15 and 37, and the water continues by the pipe 24 to the distillation stage 12, where once more part of it evaporates, owing to lower pressure and to the heat supplied by the condenser 37. The vapour liberated at the distillation stage 12 condenses in condensers 16 and 38, and the water passes through the pipe 25 to distillation stage 13. The vapour liberated in distillation stage 13 condenses in condensers 17 and 29, the cooling water that has passed through the latter of these departing by the pipe 30 to the ejector 31, which by the pipe 26 draws off the water that has remained unevaporated in distillation stage 13.

The condensate produced in the condensers 14 and 36 still contains a considerable amount of thermal energy, which may be utilized for evaporating water. The condensate accumulates in the pipe 39, whence it flows to the heat exchanger 40 in distillation stage 12, where it is cooled and heats the water to be evaporated. From here, it flows further to the heat exchanger 41, where it is further cooled, and departs through the valve 47 and pipe 48 to the ejector 49, to which the pump 50 supplied distilled water from the tank 51.

In a corresponding manner, the condensate produced in the condensers 15 and 37 accumulates in the condensate pipe 42, and it is cooled in the heat exchanger 43 and departs by the valve 46. The condensate of distillation stages 12 and 13 departs, correspondingly, through valve 45 and pipe 44 into the pipe 48. The valves 45, 46 and 47 are used to regulate the pressures prevailing in the different distillation stages, while the uncondensable gases also escape along with the condensate under effect of the ejector 49. If part of the distillation stages operate at a pressure higher than atmospheric, their condensates and uncondensable gases are not removed by ejector; they rather flow under their own pressure into the pure water tank 51.

In the embodiment of FIG. 2, the separate distillation stages operate in a manner similar to that in the embodiment of FIG. 1, for which reason all details are not described in the following. This embodiment differs from that of FIG. 1 in that energy is supplied by the motor 54 and compressor 53, which replace the heater 32 of the embodiment of FIG. 1. The compressor 53 draws part of the vapour liberated in the distillation stage 60, along the pipe 52, and compresses it to higher pressure, whereby it is heated, and delivers it to the heat exchanger 56 in distillation stage 61. The vapour condenses and evaporates new water in the distillation stage 61. The condensate is cooled in the heat exchangers 58 and 59 and departs by the valve 62 into the condensate collecting pipe 63, to which the condensate produced in the distillation stage 60 also flows through the pipe 57.

The motor 54 may be, for instance, a diesel engine, the greater part of the waste heat from which may be utilized to heat water in the heat exchanger 55. By this means the efficiency in the use of energy will be very high and, in a ten-stage distillation process for instance, the amount of energy required is about 20 kcal per kg. If the vapour is pumped with a very high differential pressure, past several distillation stages, the vapour will be adiabatically compressed to have a rather high temperature. The pumping may then be carried out in several stages and intermediate coolers similar to the heat exchanger 55 may be used, in which the excess heat is transferred to the water to be evaporated. In a multistage distillation process one may also employ several vapour returns, e.g. by returning in a nine-stage process vapour from the last stage to the seventh, from the sixth to the fourth stage, and from the third to the first stage.

The heat exchanger in which the vapour liberated in the preceding distillation stage is condensed may consist of a pipe system under the water to be distilled, of a horizontal pipe system upon which the water to be distilled falls as a spray or jet, or of a pipe system along the surface of which the water flows down in a thin layer. In the last two instances the water, at its transfer from one distillation stage to the next, has to be elevated to a level considerably higher than that of the free water level in the distillation stage from which the water departs. When the water is at the boiling point, vapour bubbles are then formed in abundance before its discharge into the next evaporator, and the pipe through which the water goes from one distillation stage to the next has to be liberally dimensioned.

This drawback may be avoided by means of the arrangement shown in FIG. 3. The water to be distilled passes from the distillation stage 64 to distillation stage 65 through a pipe 66, by which it flows to a heat exchanger 67 located in the distillation stage 65 and wherein it is cooled in heat exchange with the water to be distilled which is present in the distillation stage 65, and only when it is elevated through the pipe 68 to higher level, whence it is discharged into the evaporator of distillation stage 65. The heat exchanger 67 may also be placed in a distillation stage operating at a still lower temperature, in which instance the heat exchange takes place with greater differential temperature, whereupon the water is discharged into the evaporator of the distillation stage operating at a higher temperature.

FIG. 4 displays the design of a solution for one distillation stage, corresponding for instance to the distillation stage 12 schematically represented in FIG. 1. To the heat exchanger 37 in FIG. 1 corresponds the vertical tube 70, into which the vapour from the preceding distillation stage flows. Within the tube the condenser 72 is found, which corresponds to the condenser 15 of FIG. 1. Part of the vapour condenses in the condenser 72 and part of it on the inner surface of the tube 70. The condensate accumulates on the bottom of the tube 70 and departs through the pipe 86 to heat exchange with the water in the next distillation stage. The water flows from the preceding distillation stage through pipe 74 to heat exchanger 75, where it is cooled in heat exchange with the evaporated water, and it rises along pipe 73 to the annular space 71 encircling the upper end of the tube 70. From here the water discharges through a narrow gap 84 down along the outer surface of the tube 70, forming a thin water layer on the surface of the tube. When the vapour condenses onto the inner surface of the tube 70, it delivers heat to the water flowing on the outer surface, of which correspondingly a part evaporates. The formation of vapour bubbles in the water flowing on the surface of the tube causes powerful turbulence and improves the heat exchange, but it also causes splashing of water drops, which leave the surface of the tube. For this reason on the inner surface of the protective tube 77 surrounding the tube 70 flow obstacles 78 have been installed, which return water that has been thrown into the tube 77 back to the surface of the tube 70. The flow obstacles have been so designed that they run only part of the circumference of the tube 77, in order that the vapour flowing downwardly in the space between the tubes 70 and 77 might have an unobstructed path. At the lower end of the tube 70 the water furthermore comes into heat exchange with the condensate flowing in the heat exchanger 76, which condensate comes from the preceding distillation stage. This heat exchanger corresponds to the heat exchanger 40 in FIG. 1. From the bottom of the distillation stage the water departs by the pipe 85 to the next distillation stage.

The vapour liberated in the distillation stage rises upwardly in the annular space between the tube 77 and the jacket tube 79 and is forced to travel upwardly through a helical flow duct 80. In this duct the vapour has a high velocity, as a result of which the radial acceleration, easily several hundred times the acceleration of earth gravity, flings any water droplets which may have been entrained with the vapour through small apertures 81 into the annular space 82, whence they run back down. The pure vapour continues its upward flow and departs through the pipe 83 to the next distillation stage.

The design illustrated by FIG. 4 is particularlyy well appropriate for comparatively small distilling plants. In larger embodiments one distillation stage may contain several heat exchange tubes 70, in which case the water supply bed 71 is common to all these in that each tube is encircled by its own annular gap 84. However, the droplet separator 80 may be common to all tubes.

Figure 5:
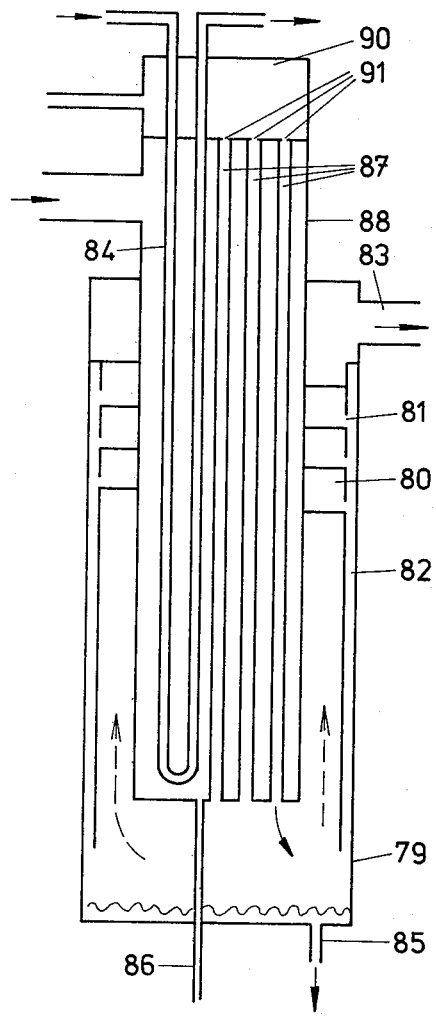

In larger embodiments, of the type shown in FIG. 5, one distillation stage may contain several heat exchange tubes 87, on the inner surface of which the water to be distilled flows downwardly, at the same time evaporating, and on the outer surface of which the vapour from the preceding distillation stage condenses. The mixture of water and vapour discharges at the lower end of the tubes 87 to become lodged on the bottom of the distillation stage, whence the vapour rises into the drop separator 80 and the water flows to the next distillation stage by the pipe 85. The drop separator 80 may be common to all tubes and mounted in the annular space between the jacket 88 of the heat exchange pipe system and the outer jacket 79 of the distillation stage. This helix 72 may then be replaced, for instance, with a U-shaped heat exchanger 89 placed in the jacket space of the heat exchange tube system. The water is discharged into the heat exchange tubes from a common water bed 90 through nozzles 91, at a temperature which makes it superheated with reference to the pressure prevailing in the tubes, whereby part of it evaporates and efficiently spreads the water over the surface of the tube. The water flowing into the first distillation stage may be heated to superheated conditions, e.g. by means of the U-shaped heat exchanger mentioned above, in heat exchange with heating steam.

We claim:

1. Evaporator, comprising an evaporator chamber, means for introducing the liquid to be evaporated into the evaporator chamber and for conducting the vapor there produced out of the evaporator chamber, a vertical heat exchanger within the evaporator chamber wherein the liquid to be evaporated flows downwardly, means for heating said heat exchanger with a fluid warmer than the liquid to be evaporated, whereby at least part of the liquid evaporates and a mixture of liquid and vapor is discharged onto the bottom of the evaporator chamber, means for removing the liquid from the bottom of the evaporator, a stationary helically shaped flow duct within the evaporator chamber into which flow duct the vapour ascends from the bottom of the evaporator chamber and is set into a powerful rotary motion, apertures on the outer periphery of said flow duct, a space surrounding the flow duct and closed at its top so that through said apertures the liquid droplets present in the vapor are flung into said space, whence the liquid flows back to the bottom of the evaporator chamber, an aperture above the flow duct so that the pure vapor escapes through said aperture to the means for conducting the vapor out of the evaporator chamber.

2. Distilling apparatus, comprising an evaporator according to claim 1 and, furthermore, a condenser wherein the vapor produced in the evaporator is condensed to become a distillate.

3. Distilling apparatus comprising a plurality of consecutive evaporators operating at stepwise lower temperatures, each of these comprising a heat exchanger consisting of at least one vertical pipe wherein the vapor originating in the preceding distilling stage is condensed and on the opposite side of the heat exchange surface of which the liquid to be distilled flows downwardly from above, at the same time partly evaporating, and discharges together with the vapor produced into the lower part of the evaporator, a droplet separator, consisting of a helically shaped vapor flow duct into which the vapor rises from the lower part of the evaporator and in the course of its flow is set into rotary motion, apertures on the outer periphery of said flow duct, into which apertures the liquid droplets present in the vapor are flung by centrifugal force action, and an enclosed space surrounding said duct, which is closed at its top and communicates at its lower end with the lower part of the evaporator, into which space the droplets are flung from said apertures and return to the lower part of the evaporator, means for transferring the liquid to be evaporated from the lower part of the evaporator to the upper part of the next evaporator's heat exchanger, means for transferring the pure vapor from above said droplet separator into the heat exchanger of the next evaporator there to serve as heating medium, and means for removing the distillate formed by condensation from the vapor from the bottom of the evaporator's heat exchanger.

4. Distilling apparatus according to claim 3, comprising in each evaporator an auxiliary heat exchanger, through which heat exchangers the liquid to be distilled flows from the coldest to the warmest evaporator and is heated by steps prior to its discharge into the warmest evaporator.

5. Distilling apparatus according to claim 3, wherein the warmest distilling stage is heated by the aid of external energy and at least part of the vapor produced in the coldest distilling stage is condensed in heat exchange with a fluid which does not flow into the other distilling stage.

6. Distilling apparatus according to claim 3, wherein part of the vapor liberated in a given distilling stage is compressed to have a higher pressure and temperature and condensed in heat exchange with the liquid to be distilled which resides in a distilling stage having a temperature higher than that of the distilling stage in which the vapor was liberated.

7. Apparatus according to claim 6, wherein the waste heat produced at the compression of vapor is utilized for heating the liquid to be evaporated.

* * * * *

UNITED STATES PATENT OFFICE
CERTIFICATE OF CORRECTION

Patent No. 3,875,017      Dated April 1, 1975

Inventor(s) Risto Väinö Juhani Saari et al.

It is certified that error appears in the above-identified patent and that said Letters Patent are hereby corrected as shown below:

On the cover sheet insert:

[30] Foreign Application Priority Data

Finland      1126/71      April 22, 1971

*Signed and Sealed this*

*twenty-sixth* Day of *August 1975*

[SEAL]

Attest:

RUTH C. MASON      C. MARSHALL DANN
*Attesting Officer*      *Commissioner of Patents and Trademarks*